UNITED STATES PATENT OFFICE.

OTTO ERNST, OF HÖCHST-ON-THE-MAIN, GERMANY, ASSIGNOR TO FARBWERKE, VORM. MEISTER, LUCIUS & BRÜNING, OF SAME PLACE.

BLACK POLYAZO DYE AND PROCESS OF MAKING SAME.

SPECIFICATION forming part of Letters Patent No. 679,221, dated July 23, 1901.

Application filed January 29, 1901. Serial No. 45,227. (Specimens.)

*To all whom it may concern:*

Be it known that I, OTTO ERNST, Ph. D., a citizen of the Empire of Germany, residing at Höchst-on-the-Main, in the Empire of Germany, have invented a certain new and useful Black Polyazo Dye and Process of Making Same, of which the following is a specification.

If para-amidobenzene-azo 1.6 (1.7) naphthylaminsulfonic acid be treated with one molecular proportion of nitrous acid, the amido group of the benzene nucleus is changed into the diazo group and para-diazobenzene 1.6 (1.7) naphthylaminsulfonic acid is obtained. This diazoazo compound combines with chrysoidin from diazotized amidonaphtholsulfonic acid G and metaphenylene (metatoluylene) diamin in an alkaline solution in such a manner that a trisazo body is obtained of the constitution

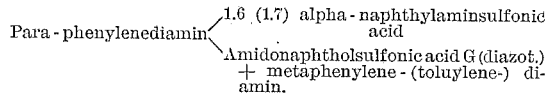

I illustrate my process by the following example: 3.64 kilograms of para-amidobenzene-azo 1.6 (1.7) naphthylaminsulfonate of sodium are dissolved with 0.700 kilogram of sodium nitrite in one hundred and fifty liters of water. The solution is brought to 15° centigrade and is run into 2.6 kilograms of raw hydrochloric acid diluted with fifty liters of water and cooled to about 10° centigrade, whereupon the greenish amidoazo compound, soluble with difficulty, is formed. This diazo compound is run into the alkaline solution of chrysoidin, kept cool, which is obtained by dissolving 3.58 kilograms of alpha$_4$-naphthol-beta$_3$-sulfonic acid-beta$_1$-azo-metaphenylenediamin, 0.8 kilogram of caustic soda, and 1.2 kilograms of sodium carbonate in the requisite quantity of water. This solution is slowly heated to 60° centigrade, and the trisazo dyestuff, which is only partly dissolved, is precipitated with common salt.

When dry, the dyestuff is a brown powder of metallic luster soluble in water with a dull-violet color and almost insoluble in alcohol. An addition of ammonia turns the color somewhat bluer. It is soluble in concentrated sulfuric acid with a gray-green color. An addition of water separates the dyestuff from this solution as a violet-blue precipitate. The dyestuff directly dyes cotton a deep black in an alkaline bath.

Having now described my invention, what I claim is—

1. The herein-described process for the manufacture of azo dyestuffs, which consists in combining a chrysoidin from one molecular proportion of diazotized amidonaphtholsulfonic acid G and one molecular proportion of metadiamin in an alkaline solution with one molecular proportion of para-diazobenzene-azo 1.6 (1.7) naphthylaminsulfonic acid, substantially as set forth.

2. As a new compound, the azo dyestuff of the constitution:

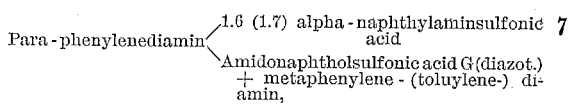

being a brown powder of slight metallic luster, almost insoluble in alcohol, soluble in water with a dull-violet color, which on addition of ammonia turns somewhat bluer; concentrated sulfuric acid dissolves it with a gray-green color; on addition of water the dyestuff is separated as a blue-violet precipitate; it directly dyes cotton a deep black.

In testimony that I claim the foregoing as my invention I have signed my name in presence of two subscribing witnesses.

OTTO ERNST.

Witnesses:
 JEAN GRUND,
 CARL GRUND.